UNITED STATES PATENT OFFICE.

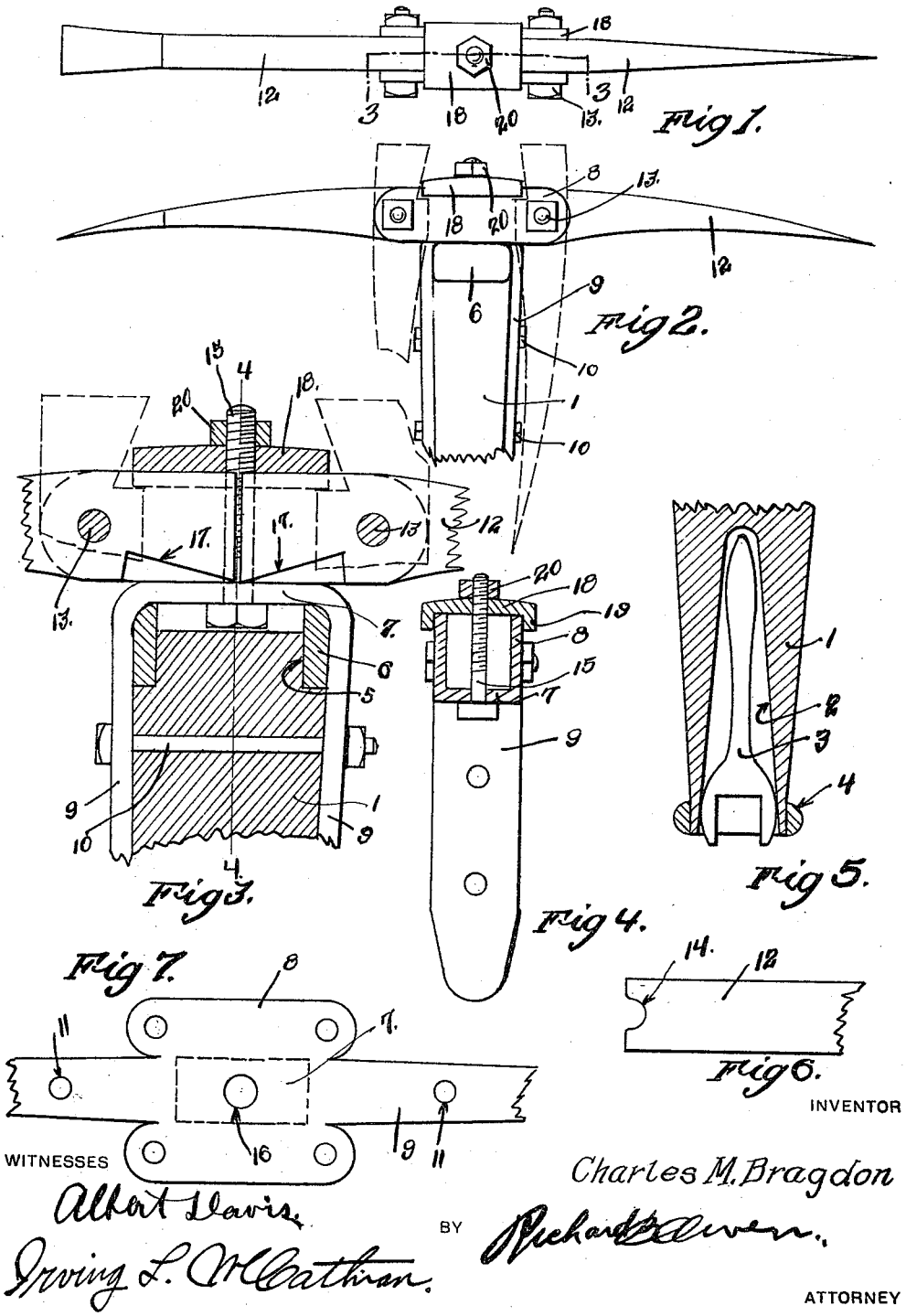

CHARLES M. BRAGDON, OF BANGOR, MAINE, ASSIGNOR OF ONE-HALF TO LESLIE W. DAVIS, OF BANGOR, MAINE.

PICKAX.

1,273,023.

Specification of Letters Patent.  Patented July 16, 1918.

Application filed December 28, 1917.  Serial No. 209,325.

*To all whom it may concern:*

Be it known that I, CHARLES M. BRAGDON, a citizen of the United States, residing at Bangor, in the county of Penobscot and State of Maine, have invented certain new and useful Improvements in Pickaxes, of which the following is a specification.

This invention relates to a pick ax and has for its object the production of a simple and efficient pick ax which may be folded for the purpose of permitting the pick ax to be carried in a minimum amount of space.

Another object of this invention is the production of a simple and efficient means for holding the picking blades in an operative position.

With these and other objects in view this invention consists of certain novel constructions, combinations and arrangements of parts as will be hereinafter fully described and claimed.

In the drawings:—

Figure 1 is a top plan view of the pick head.

Fig. 2 is a side elevation of the pick head, the blades being shown in an extended or operative position.

Fig. 3 is a vertical section taken on line 3—3 of Fig. 1.

Fig. 4 is a section taken on line 4—4 of Fig. 3, certain parts being removed.

Fig. 5 is a longitudinal section through a portion of the inner end of the pick handle.

Fig. 6 is a top plan view of one end of one of the picking blades.

Fig. 7 is a plan view of the blank from which the shank is formed.

By referring to the drawings, it will be seen that 1 designates the handle of the picking ax which is provided with a socket 2 in the lower or inner end thereof, which socket 2 is adapted to receive the wrench 3. A suitable reinforcing band 4 is placed around the inner end of the handle 1 as shown in Fig. 5 of the drawings. The wrench 3 is jammed within the socket 2 and frictionally held therein by engaging the inner face of the socket 2 as shown in Fig. 5.

The handle 1 is provided with a reduced upper or outer end 5 and a collar 6 is fitted around this reduced or outer end 5 and extends above or beyond the outer or upper end of the handle 1.

A picking blade supporting shank is fitted over the outer end of the handle 1 and this shank comprises a body portion 7 which is struck from a blank sheet of material and is provided with side flanges 8, which side flanges are bent upwardly or outwardly at right angles to the body 7. The body 7 is also provided with handle engaging tongues 9 which extend from the body 7 between the ends of the flanges 8 as shown in Fig. 7 and are bent inwardly for snugly fitting over the outer end of the handle 1 and firmly engaging the sides of the handle 1 as shown in Fig. 3 of the drawings. Suitable securing bolts 10 pass through the apertures 11 formed in the fingers 9 and also extend through the handle 1 as shown in Fig. 3.

A picking blade 12 is pivotally secured between the respective ends of the flanges 8 upon pivot pins 13. These picking blades 12 are provided with notches 14 which notches are adapted to fit around the securing bolt 15. This securing bolt 15 passes through an aperture 16 formed in the body 7 of the shank, the bolt 15 passing therethrough and extending vertically or outwardly through the shank as shown in Fig. 3 of the drawings. The inner ends of the picking blades 12 are provided with notches 17 upon their inner faces to permit the picking blades 12 to be easily swung to an operative position should any slight accumulation of dirt or other foreign substance be carried by the body portion of the picking blade supporting shank.

A locking plate 18 is carried by the bolt 15 and is provided with flanges 19 which flanges 19 overhang the side flanges 8 of the shank and hold the picking blades 12 in an operative position. A locking nut 20 is carried by the upper end of the bolt 15 for firmly holding the plate 19 in a clamped position upon the shank as shown clearly in Fig. 4 of the drawings.

When it is desired, the plate 18 may be loosened or removed from the bolt 15 and the picking blades 12 may be swung closely against the sides of the picking handle 1 thereby permitting the pick ax to be conveniently easily carried upon the back of a soldier in any convenient position and accommodate itself to a minimum amount of space.

From the foregoing description it will be seen that a very simple and efficient pick ax has been produced whereby the picking blades may very easily and quickly be swung either to an operative or an inoperative position and held in such a position by means of the locking or clamping plate 18. The notches 17 formed upon the under face of the picking blades 12, will permit the locking plate 18 to be inserted between the inner ends of the blades 12 and thereby hold the blades 12 in a closed position such as is shown in dotted lines in Fig. 3 of the drawings.

What is claimed is:—

1. A pick ax of the class described comprising a handle, a shank formed from a blank sheet of material, said shank constituting a body, side flanges bent at right angles to said body, securing fingers bent inwardly from said body and extending from between said side flanges, means for securing said fingers to said handle, and means for holding said picking blades in a set position upon said shank.

2. A pick ax of the class described comprising a handle, a shank formed from a blank sheet of material, said shank constituting a body, side flanges bent at right angles to said body, securing fingers bent inwardly from said body and extending from between said side flanges, means for securing said fingers to said handle, a clamping plate, a securing bolt carried by said shank and passing through said clamping plate, means for retaining said clamping plate upon said bolt, and said clamping plate provided with inwardly extending side flanges overlapping the side flanges of said shank.

3. A pick ax of the class described comprising a handle, a shank formed from a blank sheet of material, said shank constituting a body, side flanges bent at right angles to said body, securing fingers bent inwardly from said body and extending from between said side flanges, means for securing said fingers to said handle, a clamping plate, a securing bolt carried by said shank passing through said clamping plate, means for retaining said clamping plate upon said bolt, picking blades provided with notches upon the inner ends thereof for receiving said clamping plate when said picking blades are swung to an open position and thereby holding said blades in an open position.

4. A pick ax of the class described comprising a shank, a pair of picking blades secured thereto, a retaining bolt carried by said shank, a retaining plate carried by said retaining bolt and adapted to normally hold said picking blades in extended relation, and said retaining plate adapted to fit between the inner ends of said blades when the same are swung to a folded position for firmly locking said blades in a folded position.

5. A pick ax of the class described comprising a shank, a pair of picking blades secured thereto, and retaining means adapted to overhang the inner ends of said picking blades for holding the same in an extended position and also adapted to fit between the inner ends of said blades when the same are swung to a folded position for firmly locking said blades in a folded position.

In testimony whereof I affix my signature in presence of two witnesses.

CHARLES M. BRAGDON.

Witnesses:
WM. S. ROBINSON,
M. E. HOLLIHAN.

Copies of this patent may be obtained for five cents each, by addressing the "Commissioner of Patents, Washington, D. C."